United States Patent Office 3,022,354

Patented Feb. 20, 1962

3,022,354

4-POLYALKYLENEOXY-1-NAPHTHOLS

Milton Green, Newton Highlands, and Warren E. Solodar, Watertown, Mass., assignors to Polaroid Corporation, Cambridge, Mass., a corporation of Delaware

No Drawing. Filed Aug. 27, 1957, Ser. No. 680,618

7 Claims. (Cl. 260—613)

This invention relates to chemistry and more particularly to novel chemical compounds.

One object of this invention is to provide novel substituted naphthalene compounds and suitable synthesis for their preparation.

Another object of this invention is to provide novel substituted naphthalene compounds which are useful as dye intermediates.

Other objects of the invention will in part be obvious and will in part appear hereinafter.

The invention accordingly comprises the product possessing the features, properties and the relation of components which are exemplified in the following detailed disclosure, and the scope of the application of which will be indicated in the claims.

For a fuller understanding of the nature and objects of the invention, reference should be had to the following detailed description.

The novel compounds of this invention may be represented by the formulae:

(A)

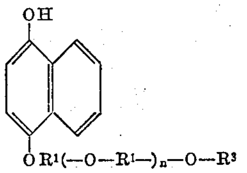

and (B)

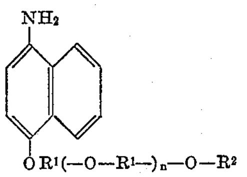

wherein each $R^1$ is an alkylene group containing at least two carbon atoms and preferably a lower alkylene group contaniing no more than five carbon atoms, such as a propylene, ethylene, etc., group; *n* is 0 to 4; $R^2$ is an alkyl group and preferably an alkyl group containing no more than five carbon atoms such as butyl, propyl, ethyl, etc.; and $R^3$ is an alkyl group and preferably a lower alkyl containing no more than five carbon atoms, an aryl group or an aralkyl group such as a benzyl group.

In a preferred embodiment *n* is 0 to 2. Such compounds may be represented by the formulae:

(C)

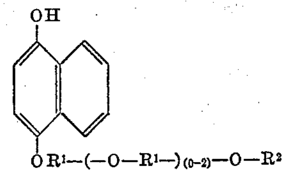

and (D)

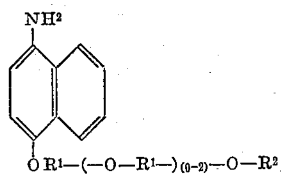

The preferred compound of this invention is 4-(ethoxy-ethoxy-ethoxy)-1-naphthol of the structure:

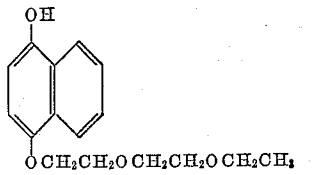

As examples of other compounds within the scope of this invention, mention may be made of:

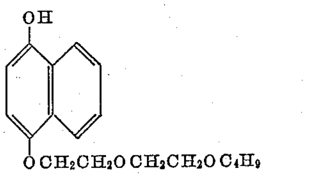

4-(butoxy-ethoxy-ethoxy)-1-naphthol

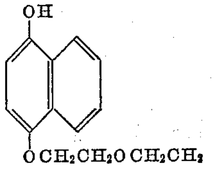

4-(ethoxy-ethoxy)-1-naphthol and

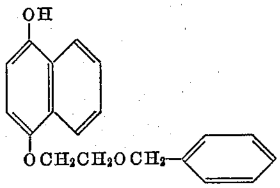

4-(benzyloxyethoxy)-1-naphthol

The novel substituted naphthol compounds of this invention may be prepared by reacting a 1,4-dihydroxy-naphthalene with a suitable ether-substituted or polyether-substituted aliphatic alcohol in the presence of hydrochloric acid.

The novel substituted naphthylamine compounds may be prepared by reacting α-naphthol with a suitable ether-substituted or polyether-substituted aliphatic alcohol in the presence of hydrochloric acid, nitrating the resulting polyalkyleneoxynaphthalene compound, and reducing the resulting nitro-substituted compound to the amine.

As examples of ether-substituted aliphatic alcohols which have been used to prepare the novel compounds of this invention, mention may be made of:

Ethylene glycol monomethyl ether $$CH_3OCH_2CH_2OH$$

Ethylene glycol monoethyl ether $$C_2H_5OCH_2CH_2OH$$

Ethylene glycol monobutyl ether $$C_4H_9OCH_2CH_2OH$$

1-butoxy-ethoxy-2-propanol $$C_4H_9OC_2H_4OCH_2\underset{\displaystyle OH}{\underset{|}{C}}HCH_3$$

Diethylene glycol monomethyl ether $$CH_3O(CH_2CH_2O)_2H$$

Diethylene glycol monoethyl ether $$C_2H_5O(CH_2CH_2O)_2H$$

Diethylene glycol monobutyl ether $$C_4H_9O(CH_2CH_2O)_2H$$

Methoxy triglycol $$CH_3O(CH_2CH_2O)_3H$$

Ethoxy triglycol $$C_2H_5O(CH_2CH_2O)_3H$$

2-benzyloxyethanol

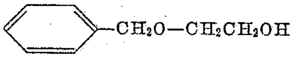

The following nonlimiting examples illustrate the preparation of polyalkyleneoxy-naphthols in accordance with this invention.

*Example 1*

16 gms. of 1,4-naphthalenediol is dissolved in 50 gms. of 2-benzyloxy-ethanol with heat applied to facilitate solubilization. The resulting solution is cooled in an ice bath, saturated with hydrogen chloride gas and allowed to stand at room temperature for twelve hours. Excess hydrogen chloride and 2-benzyloxy-ethanol are removed by heating and using a water-pump vacuum. At 225° C. the water pump is replaced with an oil pump and the residue is distilled at a bath temperature up to 300° C. at 0.1 mm. pressure.

The distillate is dissolved in ether and extracted with dilute alkali. The alkaline extracts are acidified and the oil that separates is extracted with ether. The ether extract is dried and the ether driven off. The residue is distilled at about 225° C. at 0.3 mm. pressure to yield 4-(β-benzyloxyethoxy)-1-naphthol.

*Example 2*

16 gms. of 1,4-naphthalenediol is dissolved in 30 gms. of ethylene glycol monoethyl ether. The resulting solution is cooled in an ice bath, saturated with hydrogen chloride gas and allowed to stand for twelve hours. Excess hydrogen chloride and ethylene glycol monoethyl ether are removed by heating and using a water-pump vacuum. At 175° C. the water pump is replaced with an oil pump and the residue is distilled at a bath temperature up to 275° C. at 0.1 mm. pressure.

The distillate is dissolved in ether and extracted with dilute alkali. The alkaline extracts are acidified and the oil that separates is extracted with ether. The ether extract is dried and the ether is driven off. The residue is distilled at about 250° C. at 0.1 mm. pressure to yield 4-(ethoxy-ethoxy)-1-naphthol melting at 65 to 68° C. and showing the following carbon and hydrogen analysis:

| | Found, percent | Calculated, percent |
|---|---|---|
| Carbon | 72.1 | 72.4 |
| Hydrogen | 7.0 | 6.9 |

*Example 3*

16 gms. of 1,4-naphthalenediol is dissolved in 44 gms. of diethylene glycol monoethyl ether. The resulting solution is cooled in an ice bath, saturated with hydrogen chloride gas and allowed to stand for twelve hours. Excess hydrogen chloride and diethylene glycol monoethyl ether are removed by heating and using a water-pump vacuum. At 200° C. the water pump is replaced with an oil pump and the residue is distilled at a bath temperature up to 300° C. ot 0.1 mm. pressure.

The distillate is dissolved in ether and extracted with dilute alkali. The alkaline extracts are acidified and the oil that separates is extracted with ether. The ether extract is dried and the ether is driven off. The residue is distilled at about 230° C. at 0.1 mm. pressure to yield 4-(ethoxy-ethoxy-ethoxy)-1-naphthol.

An alternate and more simplified procedure for separating the product in the above examples comprises pouring the reaction product from the hydrogen chloride condensation step into water, extracting with ether, washing the ether extract several times with concentrated ammonia, evaporating off the ether, solubilizing the residue in an alkaline solution and precipitating with acid.

*Example 4*

16 gms. of 1,4-naphthalenediol is dissolved in 54 gms. of diethylene glycol monobutyl ether. The resulting solution is cooled in an ice bath, saturated with hydrogen chloride and allowed to stand for twelve hours. After twelve hours the mixture is poured into water and extracted with ether. The ether extract is washed several times with concentrated ammonia and evaporated to dryness. The residue is taken up in an alkaline solution and precipitated with acid to yield 4-(butoxy-ethoxy-ethoxy)-1-naphthol having a boiling point of 225 to 227.5° C. A carbon and hydrogen analysis of the product shows the following:

| | Found, percent | Calculated, percent |
|---|---|---|
| Carbon | 70.7 | 71.1 |
| Hydrogen | 8.0 | 7.9 |

As noted above, polyalkyleneoxy-naphthylamines may be prepared by reacting alpha naphthol with an appropriate ether-substituted or polyether-substituted aliphatic alcohol, nitrating the resulting product and reducing the nitro-substituted compound to the amine. Thus, 4-ethoxy-ethoxy-1-naphthylamine may be prepared by reacting alpha naphthol with ethylene glycol monoethyl ether in the presence of hydrochloric acid. The resulting 1-ethoxy-ethoxy-naphthalene is nitrated with nitric acid, and the product thereof hydrogenated, e.g., over a palladinized barium sulfate catalyst, to obtain 4-ethoxy-ethoxy-1-naphthylamine.

The novel compounds of this invention are useful as coupling components in the preparation of azo dyes, for example, by coupling with diazotized aniline, using azo coupling conditions similar to those used when coupling into naphthol couplers such as 4-methoxy-1-naphthol. The novel compounds of this invention are particularly useful in preparing azo dyes of the type disclosed and claimed in the copending application of Elkan R. Blout, Milton Green and Howard G. Rogers, Serial No. 612,045, filed September 25, 1956. In this respect the polyalkyleneoxy-substituted compounds are especially useful in that the resulting dyes have increased surface activity.

Since certain changes may be made in the above product without departing from the scope of the invention herein involved, it is intended that all matter contained in the above description shall be interpreted as illustrative and not in a limiting sense.

What is claimed is:

1. A compound selected from the group of compounds represented by the formula:

(A)

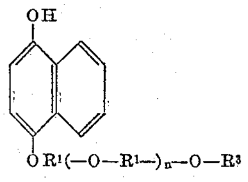

wherein each $R^1$ is an alkylene group containing from two to five carbon atoms; $n$ is selected from the group consisting of 0, 1, 2, 3 and 4; and $R^3$ is selected from the group consisting of lower alkyl and benzyl groups.

2. A compound as defined in claim 1, wherein each $R^1$ is an ethylene group.

3. A compound as defined in claim 1, wherein $R^3$ is a butyl group.

4. As a compound, 4-(ethoxy-ethoxy)-1-naphthol.

5. As a compound, 4-(ethoxy-ethoxy-ethoxy)-1-naphthol.

6. As a compound, 4-(benzyloxyethoxy)-1-naphthol.

7. As a compound, 4-(butoxy-ethoxy-ethoxy)-1-naphthol.

References Cited in the file of this patent

UNITED STATES PATENTS

| | | |
|---|---|---|
| 2,178,831 | Bruson | Nov. 7, 1939 |
| 2,280,722 | Schneider et al. | Apr. 21, 1942 |
| 2,334,201 | Kamm et al. | Nov. 16, 1943 |
| 2,691,681 | Linch | Oct. 12, 1954 |
| 2,847,478 | Hwa et al. | Aug. 12, 1958 |
| 2,848,426 | Newey | Aug. 19, 1958 |

OTHER REFERENCES

Elsevier's Encyclopedia of Organic Chemistry, vol. 12B, page 1977 (1950).

Brewster Organic Chemistry: 2d ed., page 132 relied on (1954), Prentice Hall, Inc., New York.